No. 736,611. PATENTED AUG. 18, 1903.
C. G. P. DE LAVAL.
PROCESS OF EXTRACTING ZINC FROM ITS ORES.
APPLICATION FILED NOV. 15, 1901.
NO MODEL.
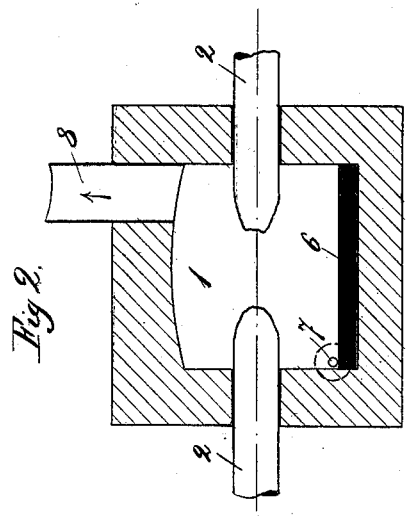
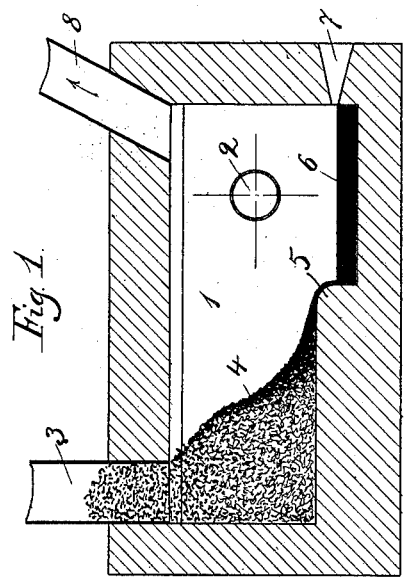

No. 736,611. Patented August 18, 1903.

UNITED STATES PATENT OFFICE.

CARL GUSTAF PATRIK DE LAVAL, OF STOCKHOLM, SWEDEN.

PROCESS OF EXTRACTING ZINC FROM ITS ORES.

SPECIFICATION forming part of Letters Patent No. 736,611, dated August 18, 1903.

Application filed November 15, 1901. Serial No. 82,372. (No specimens.)

*To all whom it may concern:*

Be it known that I, CARL GUSTAF PATRIK DE LAVAL, doctor of philosophy, of Stockholm, Sweden, have invented a new and useful Process of Extracting Zinc from Its Ores, of which the following is a specification.

A satisfactory process has long been desired for the distillation of zinc from its ores, and especially from zinc-lead ores. My present invention is such a process accomplished in an electric furnace in which radiant heat is employed.

In the accompanying drawings, Figure 1 is a vertical longitudinal section of an electric furnace. Fig. 2 is a transverse section thereof at the electrodes.

1 represents the furnace-chamber; 2, the electrodes; 3, a conduit through which the charge is introduced into the furnace-chamber.

8 is a separate conduit for the escape of the volatilized ingredients from the ore.

6 is a collecting-basin for the non-volatilized ingredients in molten state. 7 is an outlet-opening for said basin.

My process is carried into effect in the following manner: The comminuted ore is introduced into the furnace-chamber 1 through conduit 3, so as to form a pile or stack, which rests on the bottom of the furnace-chamber and which pile is of gradually-decreasing height, sloping toward the source 2 of electric heat. By the reaction of the radiant heat upon the sloping surface of the pile presented to it the non-volatile ingredients of the ore melt and flow down the slope and finally pass over the ledge 5 into the basin, from which they may be removed through the outlet 7. As this melting and running down takes place new surfaces of the stack are constantly exposed to the radiation. Simultaneously with this operation the metal vapors mixed with the generated gases escape from the sloping surface and pass out of the chamber through the outlet 8. Said vapors are then condensed by any suitable means.

In carrying out the aforesaid process the zinc ore is preferably finely ground and pulverized and then mixed in suitable proportions with finely-pulverized carbon. If the zinc ore has not been roasted, it is preferably mixed with iron ore while the ingredients are dry, the whole being afterward moistened, if required. The object of mixing in the iron ore is to eliminate the sulfur contained in non-roasted zinc ore, in which ore the zinc occurs as zinc sulfid.

I claim—

1. The process of extracting a volatilizable metal from its ore which consists in subjecting the ore in comminuted condition formed in a stack or pile in a furnace-chamber to the action of radiant electric heat upon a sloping surface of said stack and conducting away and condensing the metallic vapor generated at said surface.

2. The process of treating the ore of a volatilizable metal by radiant heat in an electric furnace which consists first in introducing said ore in comminuted state to form on the bottom of said furnace a pile or stack of gradually-decreasing height sloping toward a source of electric heat, second, causing the non-volatile ingredients of said ore to melt and run down said surface so as to expose new layers of material constituting said stack to the action of said heat, and third, conducting the volatile metal vapors and generated gases by a separate outlet from said furnace and condensing said metal vapors.

3. The process of extracting zinc from its ore which consists in introducing comminuted ore into an electric furnace to form a pile or stack on the bottom thereof of gradually-decreasing height sloping toward the source of electric heat, second, causing the non-volatile ingredients of said ore to melt and run down said surface so as to expose new layers of material of said stack to the action of said heat, third, removing the volatilized zinc by a separate outlet from said chamber and condensing the same.

4. The process of extracting zinc from its ore, which consists in first crushing and mixing the ore with finely-pulverized carbon, second, subjecting said mixture formed in a stack or pile in the furnace-chamber to the action of radiant electric heat upon the sloping surface of said stack, and third, conducting away and condensing the zinc-vapor generated at said surface.

5. The process of extracting zinc from its ore, which consists in first crushing unroasted zinc, second, combining therewith a proportion of iron ore, third, subjecting the mixture in a stack or pile in a furnace-chamber to the action of radiant electric heat upon a sloping surface of said stack, and fourth, conducting away and condensing the zinc-vapor generated at said surface.

In testimony that I claim the foregoing as my invention I have signed my name in presence of two subscribing witnesses.

CARL GUSTAF PATRIK DE LAVAL.

Witnesses:
WALDEMAR BOMAN,
H. RIDDERSTOLPE.